March 7, 1967  E. S. KARSTENS  3,307,269
PRECISION LEVELING METHOD
Filed April 16, 1963  4 Sheets-Sheet 1
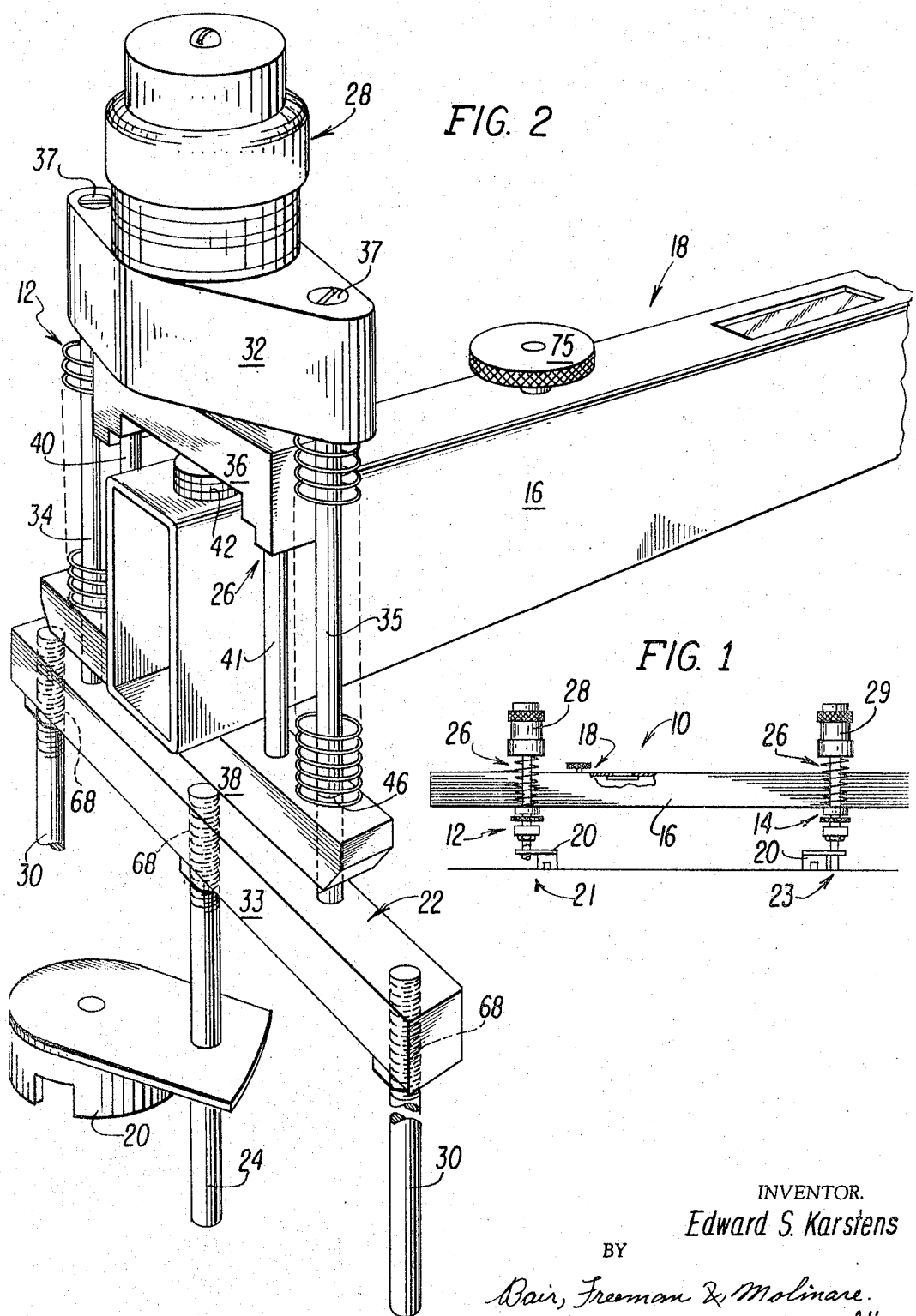
INVENTOR.
Edward S. Karstens
BY
Bair, Freeman & Molinare.
Attys.

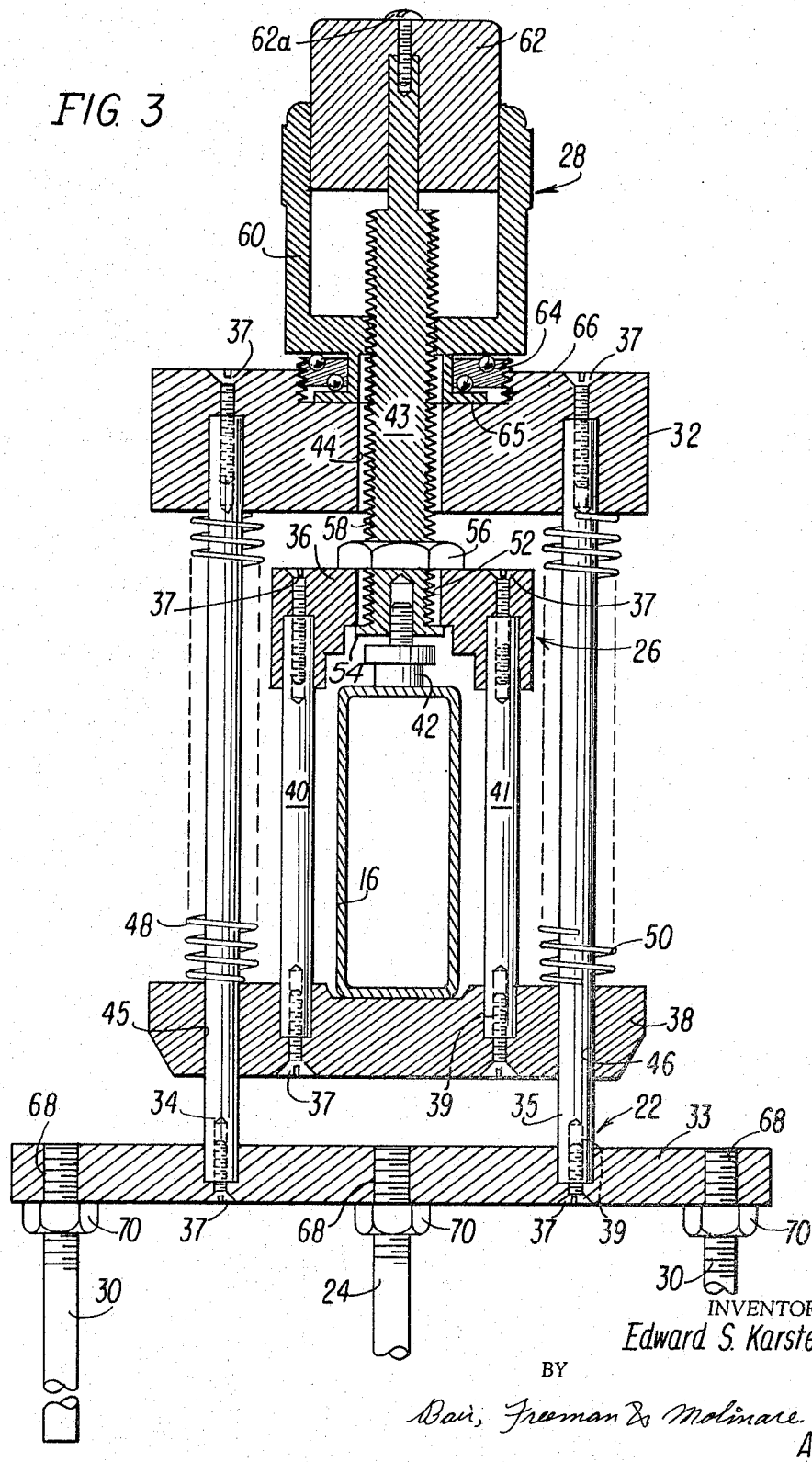

March 7, 1967 — E. S. KARSTENS — 3,307,269
PRECISION LEVELING METHOD
Filed April 16, 1963 — 4 Sheets-Sheet 3

INVENTOR.
Edward S. Karstens
BY
Bair, Freeman & Molinare
Attys.

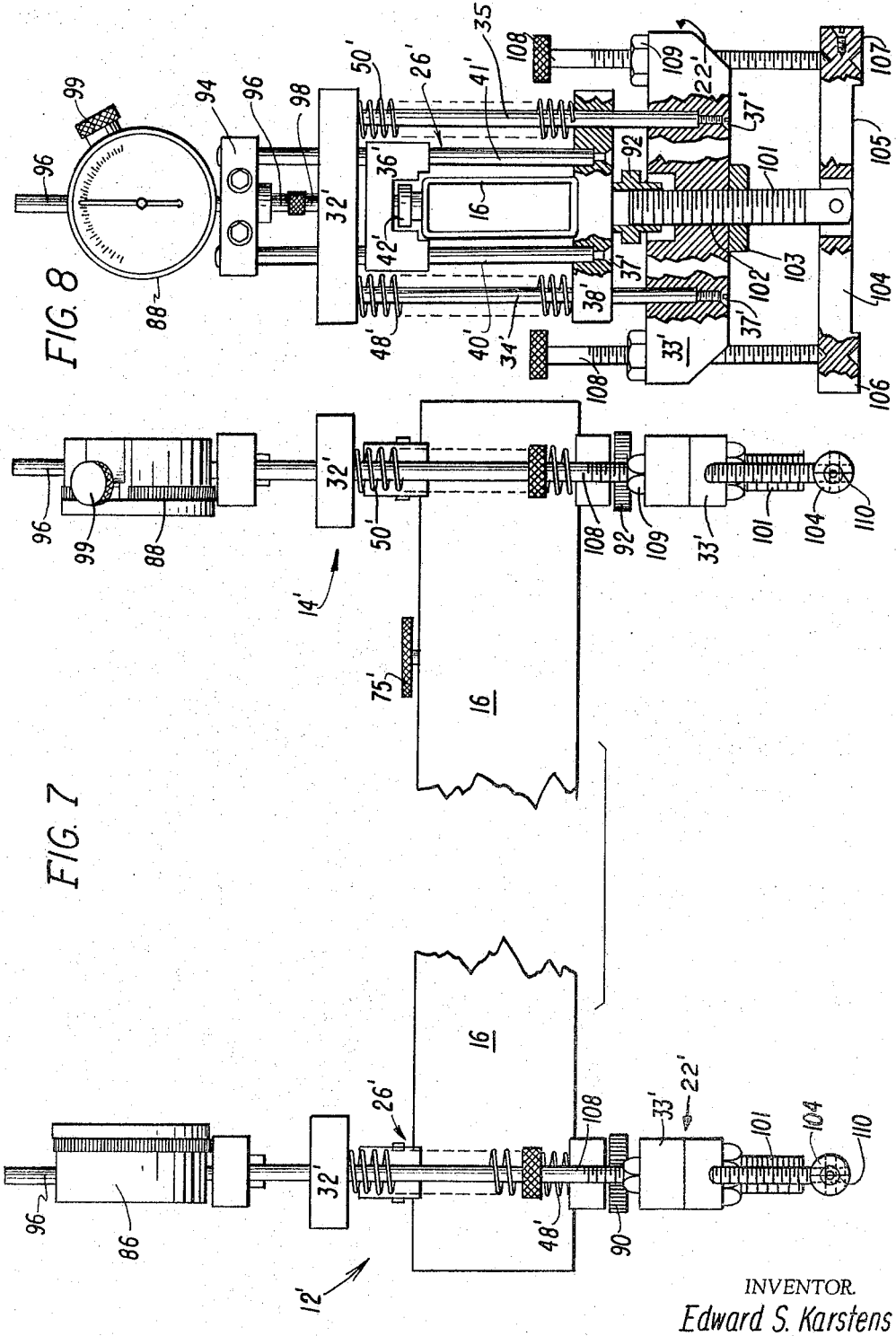

United States Patent Office 3,307,269
Patented Mar. 7, 1967

3,307,269
PRECISION LEVELING METHOD
Edward S. Karstens, P.O. Box 2093,
Davenport, Iowa 52804
Filed Apr. 16, 1963, Ser. No. 273,457
3 Claims. (Cl. 33—214)

This invention relates to apparatus adapted for various leveling requirements and, particularly, to precision leveling apparatus and an improved method of leveling.

Much of the prior leveling of machinery, equipment, foundations, supports, and the like, has involved laborious and time consuming procedures, which are often difficult and require excessive equipment, especially when precision leveling is mandatory. Exact leveling is required in many different instances such as, for example, in the manufacture, assembly and installation of heavy operating machinery, in the assembly and operation of metal working machinery, in constructing foundations, in leveling machine surfaces, in leveling and aligning shafts, and leveling and aligning rolls in paper, sheet steel and aluminum mills.

An important object of the present invention is to provide improved apparatus adapted for precision leveling in these and numerous other applications.

Another object of the present invention is to provide simple, compact and reliable leveling apparatus which provides exact leveling without need for additional devices or equipment.

An additional object of the present invention is to provide apparatus adaptable to various leveling problems and particularly to the different sizes, spacings and surface types encountered, such apparatus functioning with micrometer precision and with speed.

Another object of the present invention is to provide an improved method of leveling.

These and other objects, advantages and functions of the invention will be apparent upon reference to the specification and to the attached drawings, in which like reference numerals represent like elements in each of the views, and in which:

FIGURE 1 is a side elevational view of one embodiment of the leveling device of the present invention;

FIGURE 2 is a perspective view, on an enlarged scale, of one end of the leveling device of FIGURE 1 illustrating more clearly a pedestal thereof;

FIGURE 3 is a cross-sectional view of the pedestal illustrated in FIGURE 2;

FIGURE 7 is a side elevational view of a modification of the precision leveling device of the present invention; and FIGURE 8 is an end view of the precision leveling device illustrated in FIGURE 7.

Figure 4:
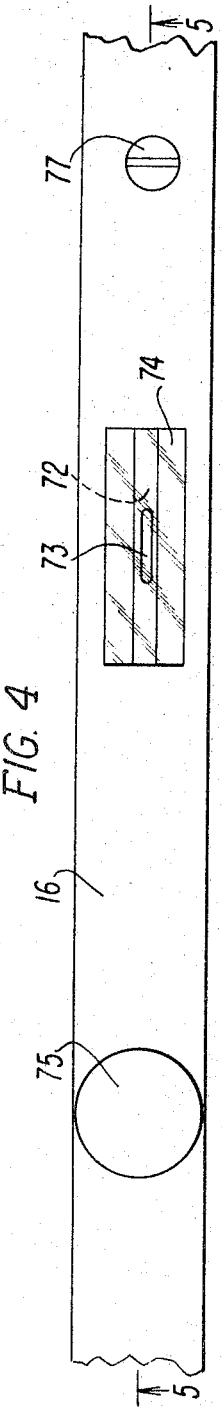
FIGURE 4 is a top view of a portion of the leveling bar illustrating the level therein.

The leveling apparatus of this invention includes as component parts, a pair of pedestals, a leveling bar movably mounted on each of the pedestals, and a level mounted on the leveling bar. Each of the pedestals comprises a holder for engaging the bar and graduated means for raising and lowering the holder and indicating quantitatively the degree of movement.

In one embodiment of the invention, each of the graduated means for raising and lowering the holder comprises a micrometer. The micrometers are similar in construction, but are graduated in the ratio of two-to-one. In a modification of the invention, each of the graduated means may comprise an indicator mechanism and adjustment mechanism for raising and lowering the holder. In the modification, the indicator mechanisms are also graduated in the ratio of two-to-one.

Referring to the drawings, the leveling device is indicated generally by the numeral 10 in FIGURE 1. The device includes a first pedestal 12, a second pedestal 14, a leveling bar 16 comprising a rectangular tube, compensator or level means 18 mounted within said bar, and a pair of locating wells 20. Each pedestal is adapted to be supported on a first place or surface 21 and a second place or surface 23 to be leveled with respect to one another.

Referring now to FIGURES 2 and 3, it is seen that the pedestal 12 includes a stanchion 22 mounted on a central leg or standard 24, a clamping frame or bar holder 26, which is vertically reciprocal on the stanchion, and a micrometer or graduated means 28 mounted on the stanchion. In addition, a pair of vertically arranged rods or outriggers 30 are connected to the stanchion 22. These stabilizers or outriggers 30 extend below bar member 33 a distance slightly less than leg 24 and serve to stabilize the remainder of the leveling device 10 while making readings and adjustments.

The stanchion 22 is composed of upper and lower horizontal bar members 32 and 33, connected by a pair of vertical stanchion tie rods 34 and 35, which straddle the leveling bar 16 when the leveling device 10 is assembled. The vertical tie rods 34 and 35 are suitably connected to the horizontal members 32 and 33, as for example, by screws 37 which engage threaded recesses 39 in the ends of rods 34 and 35.

The reciprocable or movable clamping frame 26 includes upper and lower horizontal yoke bar members 36 and 38, connected by vertical tie rods 40 and 41. The leveling bar 16 is affixed and movable with the clamping frame or bar holder 26. The means for affixing the bar 16 to the clamping frame comprises clamping means or screw 42, said screw being adjustably threaded into the end of micrometer spindle 43.

The movable frame 26 slides in the vertical direction on the stanchion tie rods 34 and 35 and is moved up and down by means of the micrometer 28. The spindle 43 of the micrometer extends through an enlarged bore 44 in the upper horizontal bar member 32 for moving the clamping frame 26. The lower horizontal yoke bar 38 of the clamping frame 26 has openings 45 and 46 therein through which the stanchion tie rods 34 and 35 extend.

Compression springs 48 and 50 are disposed about the vertical tie rods 34 and 35 and urge the lower horizontal yoke bar 38 away from the upper horizontal bar member 32.

The micrometer 28 is mounted on the upper horizontal stanchion bar 32 and is connected to the movable bar holder 26 for moving the bar holder 26 up and down. The micrometer spindle or screw shaft 43 extends through an opening 52 in the upper horizontal yoke bar 36, with the flange 54 at one end of the screw shaft 43 engaging a surface of the upper horizontal yoke bar. A lock nut 56 engages the threaded portion intermediate the ends of the screw shaft 43 to fix the screw shaft or spindle 43 with respect to the upper horizontal yoke bar 36 of the clamping frame 26. Movably mounted on the upper end of the micrometer spindle 43 is a micrometer thimble 60. Disposed between the micrometer thimble 60 and a washer 65 located in a recess 66 in the upper surface of the horizontal bar member 32 is a bearing 64. Affixed to the extremity of the spindle 43 by a screw 62a is a barrel 62.

The spindle 43 is connected to and movable with the circumferentially graduated barrel 62. The thimble 60 is also circumferentially graduated and readings may be taken from the barrel and thimble scales in the conventional manner for a micrometer. When the micrometer thimble 60 is rotated about its vertical axis, the spindle 43 and the barrel 62 move up and down and the movable frame 26 moves therewith. The position of the movable frame 26 and the leveling bar 16 clamped therein is indicated by the readings on the graduated scales.

It is to be noted that the springs 48 and 50 mounted between the horizontal bar member 32 and the lower horizontal yoke bar 38 also maintain tension between the movable components of the micrometer 28, thus insuring that the readings obtained are exact and also that the thimble is not moved when movement is not intended.

The leg 24 of the pedestal 12 is threaded into a central opening 68 in the horizontal bar member 33. The stabilizer legs 30 are likewise threadedly engaged in openings 68 in the lower stanchion member 33. Each of the legs is retained in the desired adjusted position by means of a lock nut 70. Thus, it is apparent that the three supporting legs of the pedestal are adjustable with respect to the lower stanchion member 33. The central standard or depending leg 24 is adapted to engage with in a locating well 20 for properly positioning the pedestal over the place to be leveled and for identically positioning the pedestals when the leveling bar is rotated 180 degrees in use.

When the pedestal leg 24 is in position in the locating well 20 for leveling, the stabilizing rods 30 are adjusted to hold the device upright. Preferably the leg 24 extends downwardly slightly below a horizontal plane passing through the bottoms of the stabilizing rods. As aforenoted, the stabilizing rods are adjustably secured to the lower horizontal bar member 33. After adjustment to a desired position, the outrigger legs 30 are retained in position by lock nuts 70, which are in threaded engagement with the respective rods.

The leveling bar 16 is preferably a rectangular tube constructed of metal or it may be composed of a plurality of tubular sections suitably joined together at their ends, depending upon the distance between the points to be leveled.

The pedestals 12 and 14 are structurally similar, accordingly, it is believed unnecessary to show the pedestal 14 in detail. Preferably the stanchion of pedestal 14 may be comprised of only a central leg or standard 24 and the outriggers are omitted. Outriggers need be provided on only one pedestal to properly support the device.

An important feature of the present invention is the specific cooperation between the micrometers on each of the pedestals 12 and 14, respectively. The micrometers 28 and 29 are of similar construction, except that micrometer 28 operates in a two-to-one ratio with respect to the other micrometer, that is, the graduations on the micrometers are in the ratio of two-to-one. The micrometer 28 on the pedestal 12 may be considered to be a "standard" micrometer and the micrometer 29 may be considered to be a "special" micrometer. Considering specifically a presently preferred embodiment of the invention, the graduations on micrometer 28 will indicate 0.050 inch for one revolution of the thimble thereof, whereas the micrometer 29 will indicate 0.025 inch for one revolution of the micrometer thimble. By virtue of the unique cooperation between the micrometers, the leveling procedure utilizing the precision leveling device of the present invention is materially simplified and the precision and accuracy of leveling is greatly improved. The cooperation between the two micrometers will be made more clear when the operation of the precision leveling device is considered hereinafter.

Turning now to FIGURE 4, there is illustrated a top view of a portion of the leveling bar 16. The level 72 is disposed within the leveling bar 16 beneath a sight glass 74. The adjustment or compensating screw 75 is for the purpose of adjusting the position of the bubble 73 in the level 72 independently of the actual position of the leveling bar 16.

Figure 5:
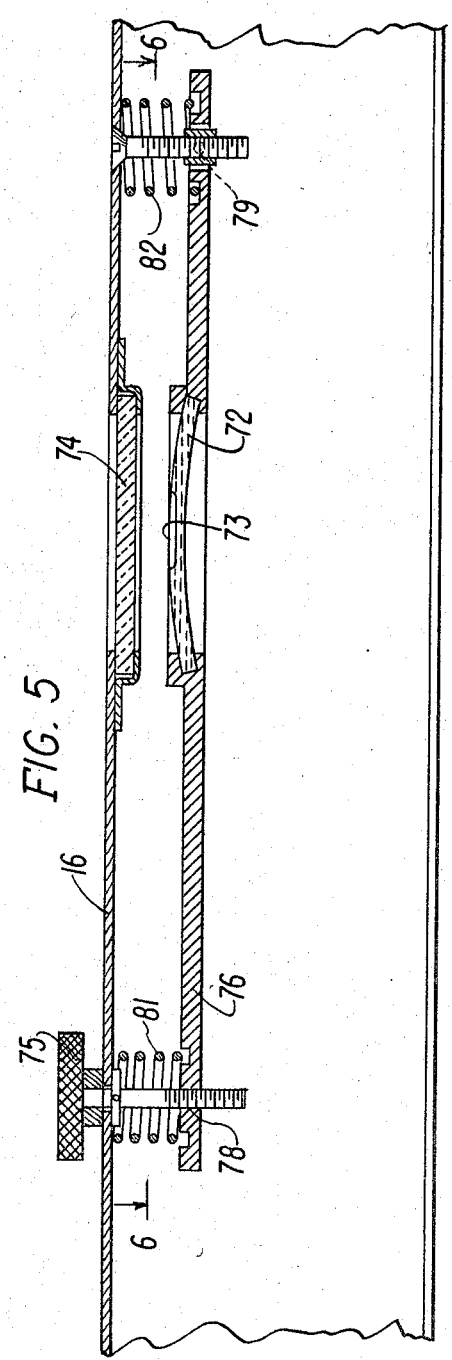
FIGURE 5 is a fragmentary cross-sectional view of the leveling bar taken generally along the line 5—5 of FIGURE 4.

In FIGURE 5, it is seen that the bubble 73 of level 72 is carried in a support bracket 76 which is affixed at each end to screw mechanisms 75 and 77. The support screw mechanism 77 is pivotally secured to an end of the bracket 76 by pivot means 79. The adjustment or compensator screw 75 is threadedly engaged in an opening 78 in the bracket 76. Coil springs 81 and 82 are disposed about the adjustment screw 75 and the support screw 77, respectively, between the top of the leveling bar 16 and the bracket 76 to maintain the bracket and, therefore, the level 72 thereon in the desired adjusted position.

Figure 6:
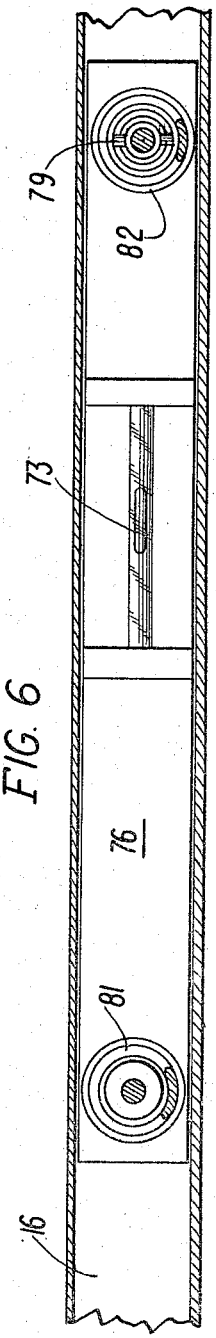
FIGURE 6 is a cross-sectional view of the leveling bar taken generally along the line 6—6 of FIGURE 5.

FIGURE 6 is a cross-sectional view of the compensator taken generally along the line 6—6 of FIGURE 5 and illustrates more clearly the pivot pin connection 79 between the adjustment screw mechanism 77 and the bracket 76.

Referring now to FIGURE 7, there is illustrated a modification of the present invention. In view of the marked similarity between the two constructions, like components will be indicated with primed numerals. The construction illustrated in FIGURE 7 comprises essentially a first pedestal 12' and a second pedestal 14' connected at each end of a leveling bar 16. In place of the micrometers of the first illustrated embodiment of the invention, there are provided indicators 86 and 88 and adjustment screws 90 and 92, respectively. The adjustment screws 90 and 92 are adapted to move the clamping frames in a vertical direction.

The indicators 86 and 88 are of like construction and the scales thereof are graduated in a two-to-one ratio as are the micrometers 28 and 29 of the first illustrated leveling device. For example, one revolution of the indicator needle on indicator 86 represents 0.050 inch, whereas one revolution of the indicator needle on indicator 88 represents 0.025 inch.

Each dial indicator includes a scale or dial lock screw 99 for locking the dial in the zero position after the indicator needle has been moved to its mid-range position by nut 90. Also included in each indicator is a spring for biasing stem 96 into engagement with projection 98.

Turning now to FIGURE 8, there is illustrated an elevational view of one of the pedestal assemblies. Essentially, the tie rods 40' and 41' are extended to provide a support for the indicator mechanism 86. To the upper ends of the tie rods is affixed a horizontal support member 94. The movable stem 96 of the indicator mechanism 86 engages a projection 98 extending upwardly from the fixed horizontal bar member 32' on the stanchion 22'. The movable frame 26' is adapted to be raised and lowered by rotation of the adjustment nut 90.

The pedestal 14' may be provided with a modified form of support means as seen in FIGURES 7 and 8. The leg member 101 is threadedly engaged in opening 102 in lower horizontal bar member 33' and retained in place by lock nut 103. Adjustment nut 90 is internally threaded and movably connected to the threaded upper end of leg member 101. Pivotally affixed to the bottom of leg member 101 is rod-like support bar 104. The central portion of bar 104 is recessed as indicated at 105 so as to provide contact surfaces 106 and 107 at the ends thereof, which surfaces are adapted to rest on a support surface to be leveled with respect to a spaced support surface. The end faces of the bar 104 have guide recesses 110 formed therein. Screws 108 having knurled heads and conical pointed ends are adjustably carried on bar member 33' for properly positioning bar 104. Lock nuts 109 hold the screws 108 in adjusted position.

*Operation*

Considering now the operation of the leveling device of FIGURES 1 through 6, it will be noted that the apparatus is preferably assembled so that the micrometers 28 and 29 indicate a zero reading. The locating wells, which have magnetic bases, are positioned on the surfaces to be leveled with respect to one another. The leveling device is positioned so that the pedestals rest in the locating wells on the surfaces to be leveled. Then the level 72 is adjusted by means of the adjusting screw or compensating screw 75 thereon to a position where the bubble 73 is centered in the level 72.

The positions of the pedestals 12 and 14 are then reversed on the surfaces to be leveled with the central legs 24 being inserted into the opposite locating wells 20. The micrometer 29 is adjusted until the bubble 73 in the level 72 is centered. The reading noted on the micrometer 29 is then set on the micrometer 28.

By shimming the lower of the two surfaces to be leveled to the reading of the micrometer 29, a precision leveling is obtained. The level may be verified by setting the leveling device 16 back onto the locating wells on two places or positions to be leveled and the bubble 73 in level 72 will indicate a zero position if operation is properly performed.

When utilizing the apparatus of FIGURES 7 and 8, parallel guide lines are scribed on the surfaces to be leveled. The support bars 104 are positioned so that the recesses in the ends thereof are aligned with said guide lines. The indicators 86 and 88 are each set at zero. Using the compensating screw 75', the level is adjusted to the position where the bubble is centered in the level. Then the pedestals 12' and 14' are transposed so that the recesses 110 in the bars 104 are aligned on the opposite guide line. In this case, the indicator 86 may be considered to be the "standard" indicator and the indicator 88 may be considered to be the "special" indicator. The scales on the indicators 86 and 88 are in the ratio of two-to-two. For a predetermined movement of stem 96 the scale on the indicator 88 will read twice as much as the scale on the indicator 86.

After transposition of the pedestals 12' and 14', the adjustment screw 92 is adjusted until the bubble is level. The adjustment nut 90 is then moved until the same reading is obtained on the indicator 86 as appears on the indicator 88, thus automatically computing the difference in elevation at the ends of bar 16. The lower of the two places to be leveled is shimmed in an amount equivalent to the reading of both indicators 86 and 88.

To verify the results of the leveling, the precision leveling device 10 is placed on the two surfaces to be leveled and the level 72 will be in the zero or level position, that is, with the bubble centered in the scale.

It is noted that stabilizing rods need be used on only one of the two pedestals in the device of FIGURES 1, 2 and 3. Further, a variety of stabilizing arrangements may be utilized, depending upon the use to which the leveling device of this invention is put. For example, the locating well may have an inverted V formed therein if the device 10 is to be used to level shafts or rolls. The support means illustrated in FIGURES 7 and 8 is particularly useful for leveling apparatus having planar top surfaces.

The invention thus provides leveling apparatus which is simple in construction and operation and is especially adapted for precision leveling. The points to be leveled may be close to each other or far apart, in which case, a number of sections of the bar 16 are joined together. This invention removes the guesswork from many leveling operations and eliminates trial and error methods. The apparatus is compact and durable. There is little need for auxiliary equipment or apparatus owing to the self-contained, self-calibrating and extensible construction of this device. In addition, there has been provided by this invention a simplified, yet highly accurate method of leveling.

While I have described presently preferred embodiments of the invention, it will be understood that the invention is not limited thereto since it may be otherwise embodied within the scope of the appended claims.

I claim:
1. The method of leveling utilizing a level mechanism comprising a leveling bar having an adjustable level means thereon, said leveling bar also having a first adjustable pedestal secured adjacent one end and a second adjustable pedestal secured adjacent the other end, each pedestal having graduated adjustment means thereon, the relation between said adjustment means being such that for equal adjustments according to graduations the second pedestal will move twice as far as the first pedestal, which method comprises the steps of mounting the leveling bar generally horizontally by placing said first pedestal over a first place and said second pedestal over a second place, said first and second places to be leveled with respect to one another, setting the adjustment means on the first and second pedestals to a zero position, adjusting the level means until it indicates level, moving the leveling bar so as to transpose the positions of said pedestals over the first and second places, adjusting the second pedestal to move said adjacent other end of the leveling bar substantially vertically until the level means indicates level, and adjusting the lower of the places to be leveled in an amount indicated by the reading of the second pedestal.

2. The method of claim 1 including the steps of adjusting the first pedestal to move the adjacent one end of the leveling bar substantially vertically until the reading of the adjustment means thereon matches the reading of the adjustment means on the second pedestal, and verifying the leveling by repositioning the level bar over the first and second places in the same way said leveling bar was originally positioned over said places and noting whether the level means indicates level.

3. The method of leveling utilizing a level mechanism comprising a leveling bar having an adjustable bubble level thereon, said leveling bar also having a first adjustable pedestal secured adjacent one end and a second adjustable pedestal secured adjacent the other end, each pedestal having graduated adjustment means thereon, the relation between said adjustment means being such that for equal adjustments according to the graduations the second pedestal will move twice as far as the first pedestal, which method comprises the steps of mounting the leveling bar generally horizontally by placing said first pedestal over a first place and said second pedestal over a second place, said first and second places to be leveled with respect to one another, setting the adjustment means on the first and second pedestals to a zero position, adjusting the bubble level until it indicates level, moving the leveling bar so as to transpose the positions of said pedestals over the first and second places, adjusting the second pedestal to move said adjacent other end of the leveling bar substantially vertically until the bubble level indicates level, adjusting the first pedestal to move said adjacent one end of the leveling bar substantially vertically until the reading of the adjustment means thereon matches the reading of the adjustment means on the second pedestal, shimming the lower of the places to be leveled in an amount indicated by the reading of the graduated adjustment means, and verifying the leveling by repositioning the leveling bar over the first and second places in the same way said leveling bar was originally positioned over said places and noting whether the bubble level indicates level.

References Cited by the Examiner
UNITED STATES PATENTS

| | | | |
|---|---|---|---|
| 809,836 | 1/1906 | Nordstrom | 33—88 |
| 1,065,744 | 6/1913 | Sutorik | 33—166 |
| 1,278,148 | 9/1918 | Heusser | 33—214 |
| 1,459,381 | 6/1923 | Von Serkey | 33—207 |
| 3,092,913 | 6/1963 | Bugge | 33—166 |
| 3,122,840 | 3/1964 | Karstens | 33—207 |

LEONARD FORMAN, *Primary Examiner.*

L. V. ANDERSON, *Assistant Examiner.*